No. 883,831. PATENTED APR. 7, 1908.
J. ROBERTSON & J. S. DELANEY.
INSTRUMENT FOR MEASURING THE THICKNESS OF LEATHER AND OTHER SHEET MATERIAL.
APPLICATION FILED JUNE 22, 1907.
2 SHEETS—SHEET 1.
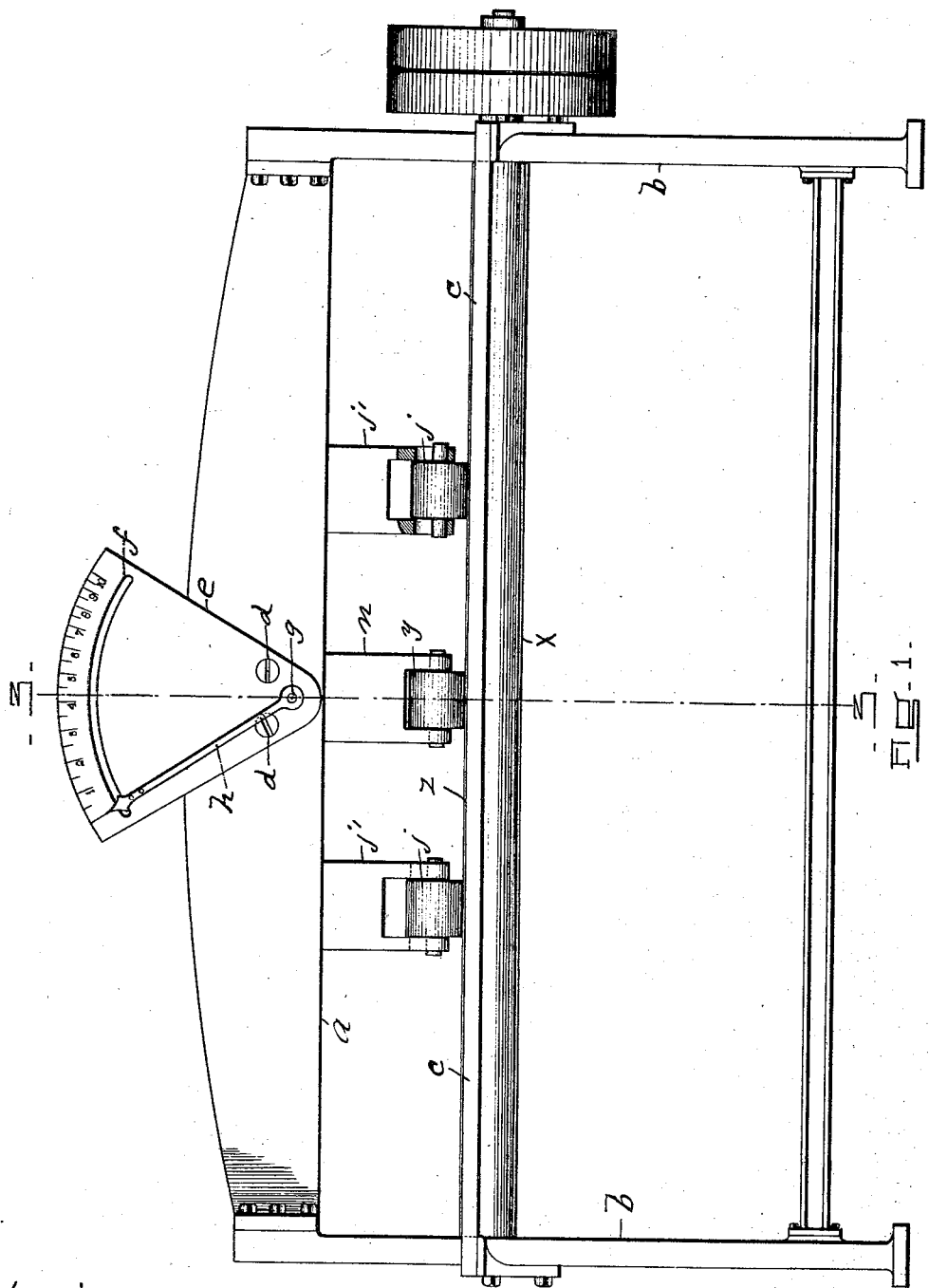
WITNESSES
INVENTORS

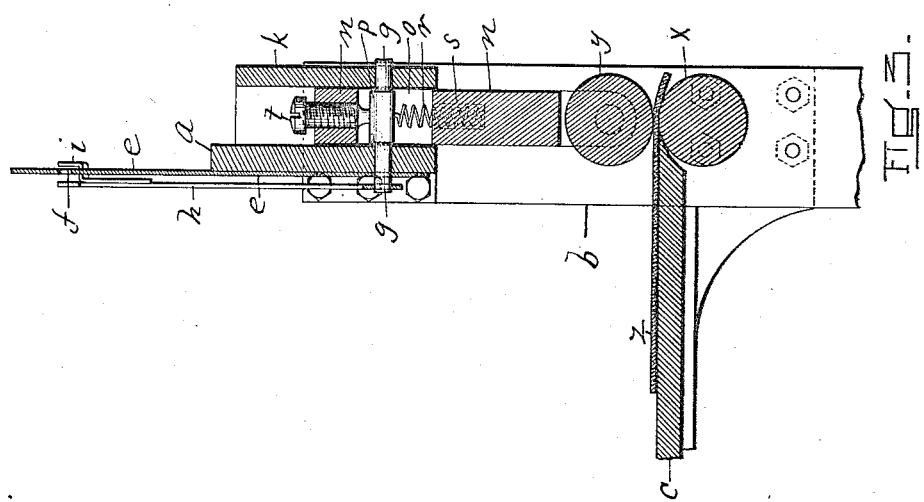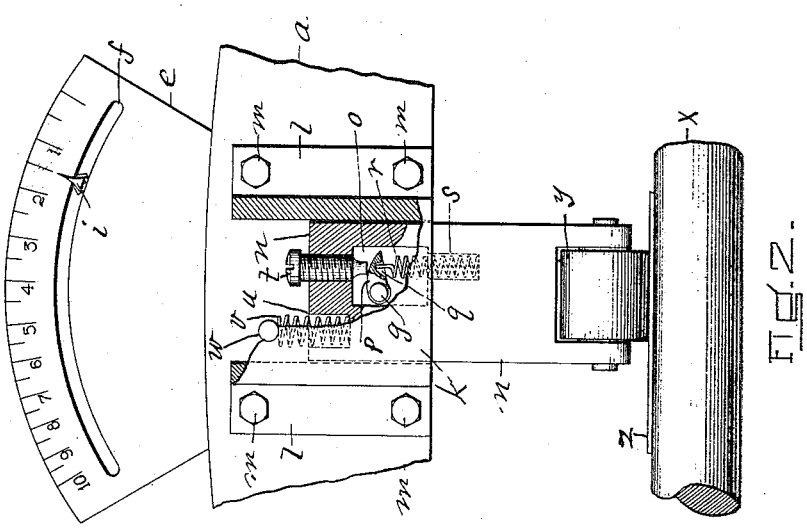

UNITED STATES PATENT OFFICE.

JAMES ROBERTSON, OF WOBURN, AND JOHN S. DELANEY, OF SOMERVILLE, MASSACHUSETTS, ASSIGNORS OF ONE-THIRD TO ALBERT W. BLISS, OF BROOKLINE, MASSACHUSETTS.

INSTRUMENT FOR MEASURING THE THICKNESS OF LEATHER AND OTHER SHEET MATERIAL.

No. 883,831.        Specification of Letters Patent.        Patented April 7, 1908.

Application filed June 22, 1907. Serial No. 380,272.

*To all whom it may concern:*

Be it known that we, JAMES ROBERTSON, a citizen of the United States, residing in Woburn, in the county of Middlesex and State of Massachusetts, and JOHN S. DELANEY, a citizen of the United States, residing in Somerville, in said county and State, have invented new and useful Improvements in Instruments for Measuring the Thickness of Leather and other Sheet Material, of which the following is a specification.

This invention relates to an improved instrument whereby the thickness of leather or other sheet material is ascertained and the number of ounces to the square foot calculated; and it consists in the novel construction and arrangement of parts fully described below, and illustrated in the accompanying drawings, in which:—

Figure 1 is an elevation of our improved device. Fig. 2 is an enlarged detail in elevation, a portion being represented as broken out. Fig. 3 is a vertical section taken on line 3—3, Fig. 1. In Figs. 2 and 3 a piece of leather is shown in position in the instrument.

Similar letters of reference indicate corresponding parts.

$a$ represents a sustaining bar supported by suitable legs $b$, and $c$ is a table or bed supported by brackets sustained by said legs. Rigidly secured at $d$ to the bar $a$ is the lower end of a sector-shaped plate $e$ provided at its upper end with a suitable scale, and with a curved slot $f$ on an arc of a circle of which a spindle $g$ is the center, said spindle having rigidly secured to its front end a pointer $h$ which extends up in front of the plate $e$ and has rigidly secured to it near its upper end an extra finger $i$ which extends through the slot $f$ and upward on the opposite side of the plate $e$, whereby scales may be applied to both sides.

The spindle $g$ has its bearings in the bar $a$ and in a guiding-frame comprising the raised central portion $k$ and the flanges $l$ integral with said central portion and secured to the bar $a$ at $m$, whereby a vertical slideway is provided for a slide $n$ whose upper portion, that is, the portion which is within the slideway, is provided with a slot $o$, the spindle $g$ extending through said slot near its left edge, as indicated in Fig. 2. The portion of this spindle which is in the slot has integral or rigid with it an arm $p$ recessed on its under side at $q$, said arm extending toward the opposite or right edge of the slot. A spring $r$ extends up from a socket $s$ formed in the slide at the bottom of the slot, against and into the recessed portion $q$ of the arm $p$, and a screw $t$ extends down through the top wall of the slot against the upper side of the arm $p$. The top wall of the slot is provided with a vertical socket $u$ in which rests a spiral spring $v$, the upper end of which is connected with a horizontal pin $w$ which extends from the central portion $e$ of the plate above and next the upper end of the spring $v$.

The frame of the instrument or machine supports a long longitudinal horizontal roll $x$, and the lower end of the slide $n$ extends down toward said roll and is itself provided with a short roll $y$ which is pressed normally on the roll $x$ or on a piece of leather $z$ which is inserted between the roll $x$ and the roll $y$, as shown, by the power of the spring $v$.

When a sheet of leather $z$ is fed from the table $c$ between the rolls $x$ and $y$, the thickness of the sheet lifts the roll $y$ and its supporting slide $n$, and of course with it the screw $t$, and the spring $r$ is allowed to expand and swing up the arm $p$ as far as said screw will allow, and as the arm is fast on the spindle $g$, said spindle rotates and moves the pointer $h$ over the scale. When a thinner place in the leather is reached as said leather is fed under the roll $y$, the spring $v$ presses the roll down, and thus the two springs $v$ and $r$ vibrate the pointer according to the thickness of the leather at different point.

It is advisable, although not absolutely necessary, that a pair of idle rolls $j$ may rest on the leather on opposite sides of the roll $y$, said idle rolls being supported in the slotted ends of the brackets or hangers $j'$ supported by the bar $a$.

The roll $x$ may be rotated for the purpose of feeding the sheet of leather, by hand or by a pulley, as illustrated, which may be connected with any suitable power.

Having thus fully described our invention, what we claim, and desire to secure by Letters Patent, is:—

1. In an instrument for measuring the thickness of sheet material, a frame, a driving roll supported by the frame, a bar above said roll, a dial supported by the bar, a vertical slideway supported by the bar, a slotted slide adapted to move in the slideway and provided with a roll adapted to rest on the sheet material as it moves over the driving roll, a spindle supported in the frame, a pointer rigid on the spindle, an arm rigid on the spindle, a spring intermediate of the arm and slide and holding the arm normally raised, and a spring intermediate of the slide and said bar for holding the slide normally down, whereby the vertical movement of the slide communicates movement to the pointer.

2. In an instrument for measuring the thickness of sheet material, a frame, a driving roll supported by the frame, a horizontal bar above said roll, a dial supported by the bar, a vertical slideway supported by the bar, a slotted slide adapted to move in the slideway and provided with a roll adapted to rest on the sheet material as it moves over the driving roll, idle rolls adapted to rest on the sheet material and yieldingly supported by the bar, a spindle supported in the frame, a pointer rigid on the spindle, an adjusting screw extending downward from the slide into the slot therein, an arm rigid on the spindle and extending into said slot under said adjusting screw, a spring intermediate of the arm and slide and holding the arm normally raised, and a spring intermediate of the slide and bar for holding the slide normally down, whereby the vertical movement of the slide communicates movement to the pointer.

3. In an instrument for measuring the thickness of sheet material, a frame, a driving roll supported by the frame, a spindle supported in the frame, a dial supported by the frame and provided with a slot on an arc of a circle of which the spindle is the center, a vertical slideway intermediate of the driving roll and the dial, a slide in the slideway, a roll supported by the slideway and adapted to rest on the sheet material as it moves over the driving roll, a pointer rigid on the spindle and extending up on one side of the dial, a finger extending from said pointer through the slot in the dial and up on the opposite side thereof, and mechanism intermediate of the spindle and the slide for imparting rotation to the spindle as the slide is moved in the slideway.

In testimony whereof we have signed our names to this specification in the presence of two subscribing witnesses.

JAMES ROBERTSON.
JOHN S. DELANEY.

Witnesses:
HENRY W. WILLIAMS,
M. A. ATWOOD.